United States Patent
Muderlak et al.

(10) Patent No.: US 7,367,541 B2
(45) Date of Patent: May 6, 2008

(54) AUTOMATIC FLUSH VALVE ACTUATION APPARATUS

(75) Inventors: Kenneth J. Muderlak, Milwaukee, WI (US); George J. Jost, Lake in the Hills, IL (US)

(73) Assignee: Technical Concepts, LLC, Mundelein, IL (US)

(*) Notice: Subject to any disclaimer, the term of this patent is extended or adjusted under 35 U.S.C. 154(b) by 0 days.

(21) Appl. No.: 10/382,111

(22) Filed: Mar. 4, 2003

(65) Prior Publication Data

US 2004/0262554 A1   Dec. 30, 2004

Related U.S. Application Data

(63) Continuation-in-part of application No. 10/032,442, filed on Dec. 21, 2001, now abandoned.

(60) Provisional application No. 60/418,122, filed on Oct. 12, 2002.

(51) Int. Cl.
*F16K 31/02* (2006.01)
(52) U.S. Cl. ................. 251/129.04; 251/291
(58) Field of Classification Search ......... 251/129.04, 251/291, 292, 293, 40; 4/604, 415; 74/568 R, 74/568 FS; 248/229.24, 74.4, 74.1, 638; 277/543–548, 632
See application file for complete search history.

(56) References Cited

U.S. PATENT DOCUMENTS

| 300,468 | A | | 6/1884 | Haskell et al. |
|---|---|---|---|---|
| 1,057,632 | A | | 4/1913 | Fraser |
| 1,114,398 | A | | 10/1914 | Sloan |
| 1,780,856 | A | * | 11/1930 | Adam .................... 74/568 FS |
| 2,007,652 | A | | 7/1935 | Kocour |
| 2,130,611 | A | | 9/1938 | Burdick |
| 2,235,304 | A | | 3/1941 | Toussaint |
| 2,355,742 | A | * | 8/1944 | Morehouse ................ 248/68.1 |
| 2,552,625 | A | | 5/1951 | Filliung |
| 2,635,691 | A | | 4/1953 | Filliung |
| 3,008,682 | A | | 11/1961 | Filliung et al. |
| 3,008,683 | A | | 11/1961 | Filliung et al. |
| 3,011,751 | A | | 12/1961 | Delaney et al. |

(Continued)

FOREIGN PATENT DOCUMENTS

JP    38-24065    11/1963

(Continued)

OTHER PUBLICATIONS

S/N 514224/97 1997 Japan.

*Primary Examiner*—Ramesh Kirshnamurthy
*Assistant Examiner*—Cloud Lee
(74) *Attorney, Agent, or Firm*—Brinks Hofer Gilson & Lione

(57) ABSTRACT

A flexible drive mechanism for a flushing apparatus actuated by movement of a flush handle via an actuation element is disclosed. The drive mechanism includes a housing and flexible drive system in the housing, the flexible drive system including an actuating element operable to move the flush handle between a non-actuating position and a full stop actuating position. The housing further includes first and second bracket halves and first and second removable insert halves for adapting the first and second bracket halves to substantially enclose and engage a bushing and nut and thereby secure said electromechanical flexible actuator to the flush lever of the sanitary fixture.

7 Claims, 13 Drawing Sheets

U.S. PATENT DOCUMENTS

| | | | |
|---|---|---|---|
| 3,019,453 A | 2/1962 | Radcliffe | |
| 3,056,143 A | 10/1962 | Foster | |
| 3,202,396 A | 8/1965 | Delaney et al. | |
| 3,462,769 A | 8/1969 | Ichimori et al. | |
| 3,680,406 A * | 8/1972 | Bush | 74/568 FS |
| 3,695,288 A | 10/1972 | Billeter et al. | |
| 3,778,023 A | 12/1973 | Billeter | |
| 3,792,627 A * | 2/1974 | Tarello | 74/568 FS |
| 3,912,219 A * | 10/1975 | Weinstein | 251/291 |
| 4,202,525 A | 5/1980 | Govaer et al. | |
| 4,235,414 A | 11/1980 | Lis | |
| 4,309,781 A | 1/1982 | Lissau | |
| 4,423,878 A * | 1/1984 | Escue | 277/306 |
| 4,505,450 A | 3/1985 | Sarrem et al. | |
| 4,508,136 A | 4/1985 | Kah, Jr. | |
| 4,655,099 A * | 4/1987 | Hansen | 248/638 |
| 4,667,350 A | 5/1987 | Ikenaga et al. | |
| 4,671,485 A | 6/1987 | Saarem | |
| 4,742,583 A | 5/1988 | Yoshida et al. | |
| 4,793,588 A | 12/1988 | Laverty, Jr. | |
| 4,805,247 A | 2/1989 | Laverty, Jr. | |
| 4,817,913 A | 4/1989 | Whiteside | |
| 4,839,039 A | 6/1989 | Parson et al. | |
| 4,883,254 A | 11/1989 | Whiteside | |
| 4,886,207 A | 12/1989 | Lee et al. | |
| 4,891,864 A | 1/1990 | Laverty, Jr. | |
| 4,911,401 A | 3/1990 | Holcomb et al. | |
| 4,971,287 A | 11/1990 | Shaw | |
| 4,972,070 A | 11/1990 | Laverty, Jr. | |
| 4,989,277 A | 2/1991 | Tsutsui et al. | |
| 5,025,516 A | 6/1991 | Wilson | |
| 5,062,453 A | 11/1991 | Saadi et al. | |
| 5,063,955 A | 11/1991 | Sakakibara | |
| 5,125,621 A | 6/1992 | Parsons et al. | |
| 5,155,870 A | 10/1992 | Tsutsui et al. | |
| 5,169,118 A | 12/1992 | Whiteside | |
| 5,187,818 A | 2/1993 | Barrett, Sr. et al. | |
| 5,195,720 A | 3/1993 | Nortier | |
| 5,224,685 A | 7/1993 | Chiang et al. | |
| 5,244,179 A | 9/1993 | Wilson | |
| 5,261,633 A * | 11/1993 | Mastro | 248/74.1 |
| 5,269,028 A | 12/1993 | Liso | |
| 5,295,655 A | 3/1994 | Wilson et al. | |
| 5,313,673 A | 5/1994 | Saadi et al. | |
| D351,219 S | 10/1994 | Saadi et al. | |
| 5,415,374 A | 5/1995 | Carroll et al. | |
| 5,431,181 A | 7/1995 | Saadi et al. | |
| 5,476,244 A | 12/1995 | Carroll et al. | |
| 5,505,427 A | 4/1996 | Whiteside | |
| 5,647,563 A * | 7/1997 | Gantner et al. | 248/74.1 |
| 5,680,879 A | 10/1997 | Sheih et al. | |
| 5,730,415 A | 3/1998 | Gronwick | |
| 5,881,993 A | 3/1999 | Wilson et al. | |
| 5,887,848 A | 3/1999 | Wilson | |
| 6,050,545 A | 4/2000 | Stolzman | |
| 6,056,261 A | 5/2000 | Aparicio et al. | |
| 6,105,926 A | 8/2000 | Oliver et al. | |
| 6,260,576 B1 | 7/2001 | Allen | |
| 6,299,127 B1 | 10/2001 | Wilson | |
| 6,349,921 B1 | 2/2002 | Jahrling | |
| 6,382,586 B1 | 5/2002 | Wilson et al. | |
| 6,408,873 B1 | 6/2002 | Hall et al. | |
| 6,643,853 B2 * | 11/2003 | Wilson et al. | 4/302 |

FOREIGN PATENT DOCUMENTS

| | | |
|---|---|---|
| JP | 55-24389 | 8/1978 |
| JP | 55-21385 | 2/1980 |
| JP | 3-12973 | 2/1991 |
| JP | 3-58368 | 6/1991 |
| JP | 5-14272 | 2/1993 |
| TW | 8411990 | 12/1996 |
| TW | 8411989 | 7/1997 |
| WO | PCT/US95/13199 | 4/1997 |
| WO | WO 9713086 A1 * | 4/1997 |

* cited by examiner

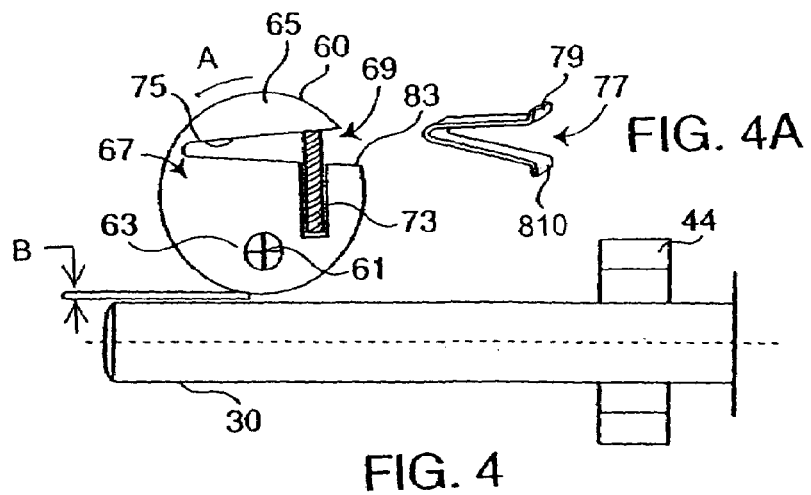
FIG. 4A
FIG. 4
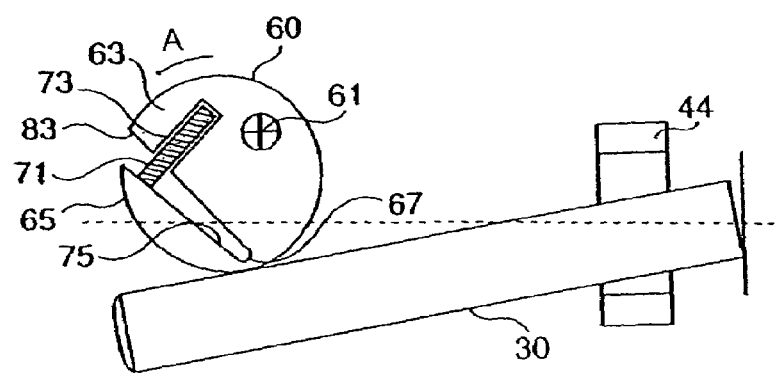
FIG. 5
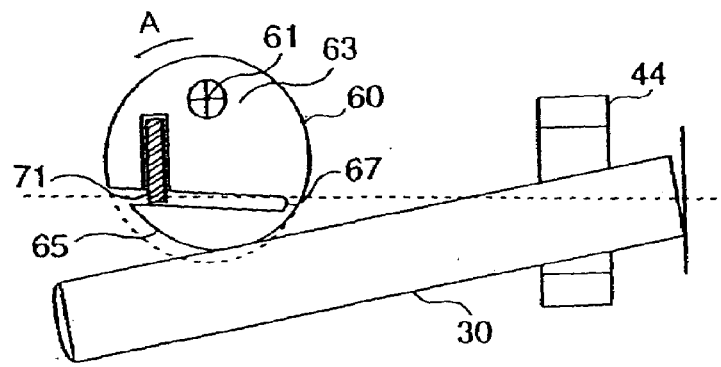
FIG. 6

AUTOMATIC FLUSH VALVE ACTUATION APPARATUS

RELATED APPLICATIONS

This is a continuation-in-part of U.S. application Ser. No. 10/032,442 filed on Dec. 21, 2001 now abandoned. This application further claims the benefit of U.S. Provisional Application No. 60/418,122 filed on Oct. 12, 2002, the entire disclosures of which are hereby incorporated by reference.

BACKGROUND

The present invention relates to automatic flush valve actuation devices for toilet and urinal facilities, and in particular to add-on flush valve operation devices that are adapted to be readily and easily attached to existing flush valve mechanisms for movement of the actuation handle of such flush valve mechanisms.

Public awareness of personal hygiene and water conservation issues has initiated a response by manufacturers of public and private sanitary and water use facilities to develop systems that eliminate human contact with environmental surfaces that may contain disease spreading bacteria and to minimize flush water usage to eliminate waste.

Many present toilet and urinal flush devices for sanitary facilities are operated by a water control valve including a manually operable flush handle adapted to be gripped and moved by a user following use of the sanitary facility. A typical valve arrangement is shown, by way of example, in U.S. Pat. Nos. 7,776,812 and 3,399,860. However, those valve actuation devices present several problems. Among these problems are the fact that with an enlightened awareness that public sanitary facilities may have been previously used by someone having a communicable or other disease that is spread upon contact, individual users of sanitary facilities are becoming reluctant to touch the flush handle and risk becoming ill. Therefore, the sanitary facility may remain unflushed, leaving human waste products in the toilet and urinal, obviously increasing the unsanitary conditions, and fouling the atmosphere in the facility. Therefore, having flush value mechanisms that people won't use can lead to extremely unsanitary and undesirable conditions.

In addition, many present flush handle operated valve mechanisms for sanitary devices are constructed such that the user can hold on to the handle for an excessive time period, retaining the valve mechanism in an open position longer than necessary to flush the toilet or urinal. This obviously wastes water, which can be a major problem in those parts of the world where water is a scarce commodity. Also, excessive water use leads to additional and unnecessary costs for the entity installing and maintaining the washroom facility.

Several systems have been developed in an attempt to address the hygiene arid water control problems of existing manual flush control mechanisms for sanitary facilities. These include structures which totally replace the manually operated flush valve mechanism with an automatic, sensor actuated flush valve operation device that is also connected to the 110 volt electrical system extant in the facility. Such a system is shown in U.S. Pat. No. 4,793,588. However, the replacement of existing manually operated flush handle devices with such units is costly, particularly in buildings such as hotels, office buildings and the like which presently have installed numerous manual handle operated flush mechanisms in their sanitary facilities. Such replacement would require the work of mechanical and plumbing personnel, and the installation cost of replacing numerous manually operable flush devices with automatic devices of the type disclosed in U.S. Pat. No. 4,793,588 would be prohibitive. Also, this replacement project would require a shut down of the water supply system or turning off water to the valve until the valve mechanisms could be replaced, which is undesirable in large hotels, offices and other structures. Additionally, building permits would be required for such a replacement project.

Another problem encountered with existing automatic, sensor actuated flush valve operation devices is that they must be installed on facilities having different heights. For example, the flush valve mechanism on a standard toilet is generally positioned lower than the flush valve mechanisms on toilets designed for use by disabled users. For such high mount facilities, the flush valve housing structures are about shoulder height of the user. Due to the placement of the sensor, when the device is mounted on a high mount facility, the sensor may be oriented at an angle that fails to respond to use of the facility and the facility may remain unflushed.

Another attempt to automatically operate a manual flush valve mechanism for a sanitary facility is shown in U.S. Pat. No. 3,056,143, which discloses a door operated electrical solenoid device for depressing a manual flush handle each time the door to the toilet stall is opened. However, the device shown in U.S. Pat. No. 3,056,143 has many shortcomings. The existing valve housing in the prior art structure would have to be disassembled, reworked and retrofitted to accept the bracket supporting the solenoid. This requires reconstruction of the valve housing. Also, the cantilever nature of the reference mounting structure will result in possible movement of the bracket upon actuation of the solenoid, and improper actuation of the flush handle. Further, the reference device is tied to the electrical system of the building in which the stall is located, requiring added installation costs. The reference device will operate each time the door opens, whereby the flush mechanisms will operate twice for each use. This waste of water could be significant, considering that sanitary facilities are operated 4,000 times per month in many installations. Additionally, in the reference device, the existing flush handle remains exposed, whereby the handle can be manually operated or kicked, as some users are prone to do to avoid touching the handle. This exposure of the handle can also lead to water waste through manual operation.

When designing a device that will automatically operate a flush handle of all existing manual flush apparatus, an important consideration is that as line water pressure increases, the handle stroke of a common flush valve must pivotally extend further from its initial position to actually flush the toilet. For example, flushing may occur with the handle pivoted one-half way through its full extent at a water pressure of 50 psi, but maybe required to be pivoted through 90 percent of its full motion to accomplish flushing at 100 psi. It has been determined that to provide proper flushing facing these variances in handle position, it is necessary to drive the handle to its full movable position, or to a metal-to-metal stop position if no buffer material is placed between the handle and the part of the valve housing through which the handle extends, to ensure that flushing occurs at high water pressures. Due to manufacturing tolerances, the "full down," "full stop," or "metal-to-metal stop" position of the handle varies somewhat between sanitary installations. If the valve operating mechanism is constructed to insure that a flush will occur at a "full down" position on one valve installation, this "full down" position may be beyond the "full down" position of another valve. In this situation, the motor driven cam or other drive mechanism will stall due to "metal-to-metal" contact between the valve handle and the valve housing before the cam has completed a full rotation. Therefore, the cam drive system for the handle must provide a degree of flexure, or "give," to allow for this difference in valve handle operating parameters.

Therefore, it is an object of the present invention to provide an automatic flush valve actuation apparatus that can be installed and mounted on existing manual flush valve mechanisms without requiring any mechanical work or structural changes to the existing manual flush mechanism.

It is a further object of the present invention to provide an automatic flush valve actuation apparatus which can be readily mounted to existing flush valve mechanisms, whereby the rush valve actuation apparatus engages a portion of the flush mechanism housing to prevent rotation of the actuation apparatus during operation.

Another object of the present invention is to provide a battery operated flush valve actuation device for a sanitary unit such as a toilet or urinal, which requires no connection to the extant electrical system of the installation in which the sanitary unit is located.

An additional object of the present invention is to provide an automatically operated actuation device for existing sanitary unit flush handle mechanisms which can be actuated by sensors responsive to use of the facility, and by timing devices that automatically actuate the flush handle at predetermined time intervals.

Another object of the present invention is to provide an automatically operated actuation device for existing sanitary unit flush handle mechanisms which can be actuated by sensors responsive to use of the facility, the automatically operated actuation device capable of being mounted on the existing flush valve housing structure at an angle, such that the sensors are responsive to both low and high mount facilities.

Yet another object of the present invention is to provide an automatically operated flush valve handle actuation device in a compact, self contained unit which can readily be attached to an existing manual flush valve mechanism on existing sanitary units without the need to connect the actuation device to any outside power or control sources.

A further object of the present invention is to provide a compact self contained flush valve handle actuation device which is automatically mounted on and aligned with the existing flush valve housing structure, whereby the mounting structure provides the necessary torque to enable the operating mechanism inside the flush handle actuation device to overcome the valve housing spring pressure acting on the flush handle and to depress the flush handle to accomplish flushing.

Another object of the present invention is to provide flexure in the valve handle drive mechanism to prevent the handle drive cam or other drive mechanism from stalling when the handle reaches its "full down" or "metal-to-metal stop" position.

Another object of the present invention is to provide a compact, battery operated self contained flush valve handle actuation device that operates on minimum power drain of the batteries, and thus provides long battery life.

Another object of the present invention is to provide a compact self contained flush valve handle actuation device which can be adapted to mount and align with a variety of existing flush valve housing structures.

SUMMARY

These and other objects and advantages of the present invention are provided in an apparatus for automatically actuating the flush handle of a flush valve mechanism of a sanitary device, wherein the flush handle extends outward from the flush valve mechanism. The flush valve mechanism includes a flat exterior surface adjacent a connecting element which connects the flush handle to the flush valve mechanism. A tension device is disposed between the flush handle and the flush valve mechanism to urge the flush handle back to a non-flush first position after the flush handle has been moved to a second flush position by the automatic flush handle actuation mechanism. The present invention provides a compact housing having a battery operated, motor driven flush handle actuation mechanism in the housing which moves the handle to the second flush position when the motor is activated. The tension device returns the handle to its first position upon completion of one flushing operation.

A sensor connected to the housing, and a timing circuit inside the housing of the present invention, operates the motor upon sensing a use of the sanitary facility to which the housing is attached. The timing circuit also enables the sanitary unit to be flushed at predetermined intervals irrespective of use, where it may be desirable to add and remove antibacterial and cleaning agents to and from the sanitary facility at night when the unit is not being used. The housing is removably mounted to the flush valve mechanism and includes a flanged surface abutting a flat surface of the flush valve mechanism which prevents the housing from rotating or otherwise moving relative to the flush valve mechanism to provide the necessary torque to the motor driven handle actuation device inside the housing.

In one illustrated embodiment of the present invention, the automatic flush handle actuating mechanism includes a flange positioned on mounting bracket and configured to provide about ±15 degrees of rotation relative to the back flat surface of housing 40. The housing may be rotated to adjust the angle of the sensor before the housing is rigidly mounted to the flush valve mechanism of the sanitary device.

In another illustrated embodiment of the present invention, the housing includes first and second bracket halves, which enclose and engage a bushing and nut thereby securing the flush lever to the sanitary fixture. The housing also includes first and second removable insert halves for adapting the first and second bracket halves to substantially enclose and rigidly engage the bushing and nut securing the housing to the flush lever of the sanitary fixture.

In another illustrated embodiment of the present invention, the first and second inserts include insert detents along opposing faces. A nut bushing is provided to engage the nut securing the flush lever to the sanitary fixture. The nut bushing includes nut bushing detents along an outer periphery, which align with the insert detents for indexing the housing relative to the sanitary fixture.

In another illustrated embodiment of the present invention, a motor driven cam device contacts the flush handle, and the cam device rotates through 360 degrees after the motor receives a short pulse of electrical energy from the batteries. A switch and latching circuit then connects the electrical power to the motor, which continues the rotation of the cam. The cam surfaces are designed to initially depress the flush handle, then to allow the tension device of the flush valve mechanism to raise the handle back to its non-flush position. The rotatable cam which engages the flush handle includes a partial flexible or shock absorber construction, such as a moveable portion of the cam, and a resilient member provided in a slot in the cam and abutting the moveable cam portion, to allow the flush handle to be moved to its full stop position while the cam continues to rotate through 360 degrees, thereby preventing the cam and drive motor from stalling. Such construction compensates for potential interference between the rotating cam at high water pressure due to the varying tolerances of the handle full stop position for different valve handle stop positions.

In another illustrated embodiment of the present invention, the motor, reduction gear train and cam drive mechanism for selectively operating the flush handle are mounted to the housing on a moveable metal plate, which is biased toward its non-operating position by a spring extending between the housing and the moveable plate. In the illustrated embodiment, the moveable plate provides flexure between the drive cam and the handle, and is mounted for pivotal rotation relative to the housing. The motor develops sufficient torque to drive any flush handle against the force of the tension device in the flush valve housing. As the drive earn rotates, and if it moves the flush handle to its "full down" position to accomplish a flushing operation, added torque produced by the motor causes the moveable plate on which the motor, gear train and cam are mounted to rotate through a relatively small angle, which allows the cam to continue to rotate through a full 360 degrees, at which point the motor plate pivots through a reverse angle and returns to its original, non-operating position.

The embodiments of the present invention are adapted to be readily installed over existing manually operated flush handle mechanisms, without the need to disassemble any of the existing flush valve mechanism structures or shut off the water supply. The present device can be installed or removed in a matter of moments, using simple hand tools, and no external plumbing or electrical connections are required.

By eliminating any intrusion into the valve mechanism itself, the present invention can be mounted onto an existing flushing mechanism without causing the possibility of leans. Also, the present invention can be installed by a building's present maintenance staff, without the requirement of building permits. The housing is also stable against rotation and lateral movement relative to the flushing mechanism.

The present invention is defined by the following claims, and nothing in this section should be taken as a limitation on those claims.

Further aspects and advantages of the invention are discussed below in conjunction with the preferred embodiments.

BRIEF DESCRIPTION OF THE DRAWINGS

FIG. 1 is a cutaway front elevational view of a flush valve mechanism assembly as commonly found in the prior art for manually flushing sanitary units such as toilets, urinals and the like;

FIG. 4 is a diagrammatic view of the relationship between the cam actuator element and the flush handle in the non-actuated position of the embodiment of the invention shown in FIGS. 2 and 3.

FIG. 4A is an optional flat spring that can be used in place of the coil spring in the cam actuator element illustrated in FIGS. 4, 5, and 6.

FIG. 5 is a diagrammatic view of the relationship between the cam actuator element and the flush handle after the flush handle has been moved to its full stop position it the embodiment of that invention shown in FIGS. 2 and 3.

FIG. 6 is a diagrammatic view of the relationship between the cam actuator element and the flush handle, illustrating the flexing of a portion of the cam as the cam continues to rotate past the full downward movement of the flush handle; in the embodiment of the invention shown in FIGS. 2 and 3.

DETAILED DESCRIPTION OF THE PRESENTLY PREFERRED EMBODIMENTS

Figure 1:
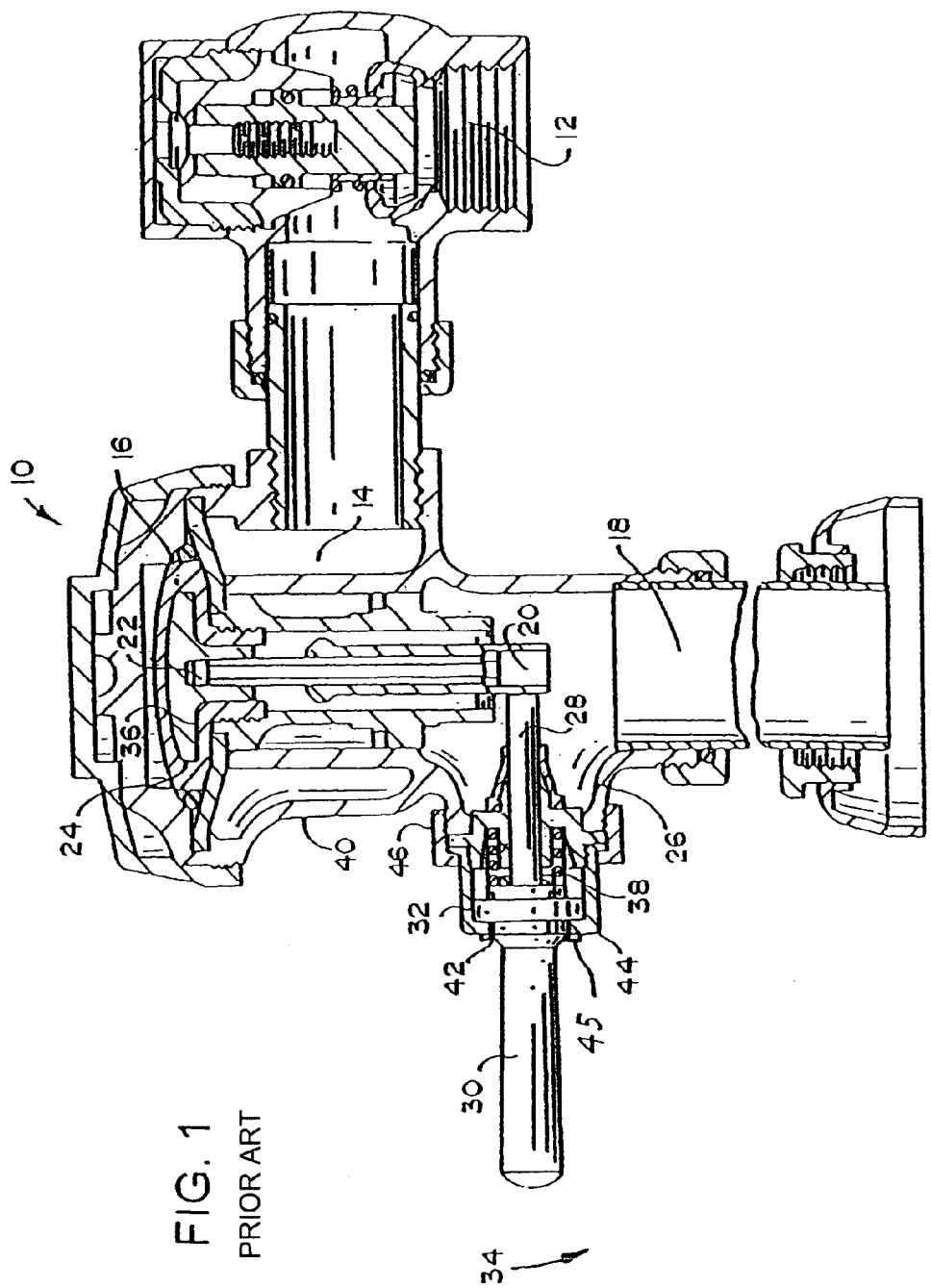

Referring to FIG. 1, a flushing mechanism commonly found in the prior art for flushing sanitary units such as toilets and urinals is designated by the numeral 10. Flush water is supplied to the flushing mechanism 10 through an intake port 12, and the water is delivered under pressure to a chamber 14 normally closed off by a valve 16. Leading from valve 16 is a water delivery pipe 18 which leads directly to a sanitary unit, such as a toilet or urinal (not shown).

The valve 16 includes a stem 20 which extends downward in pipe 18. The upper portion 22 of stem 20 is connected to a tiltable valve operating mechanism 24. The lower portion 26 of stem 20 is adapted to be contacted by a moveable plunger pin 28, which is mechanically connected to a flush handle 30 through a partial ball joint linkage mechanism 32. When flush handle 30 is manually moved through the arc 34 from its first position, shown in FIG. 1, to a second downward position (FIG. 3), plunger pin 28 moves to the right, contacts lower end 26 of stem 20, and tilts stem 20 to the right, as viewed in FIG. 1. This tilting movement of stem 20 causes valve 16 to pivot about point 36, thereby opening water delivery pipe 14 to the passage of pressurized flush water from chamber 14 and through pipe 18, thus flushing the sanitary unit.

A tension device, in the form of compression spring 38, is compressed when flush handle 30 is released, and spring 38 urges handle 30 back to the position shown in FIG. 1, thereby allowing stem 20 to return to its vertical position and close off valve 16. This halts the flushing operation through pipe 18. It has been determined empirically that a force in the range of four to eleven pounds is required to move flush handle 30 through arc 34 against the force of spring 38.

Figure 10:
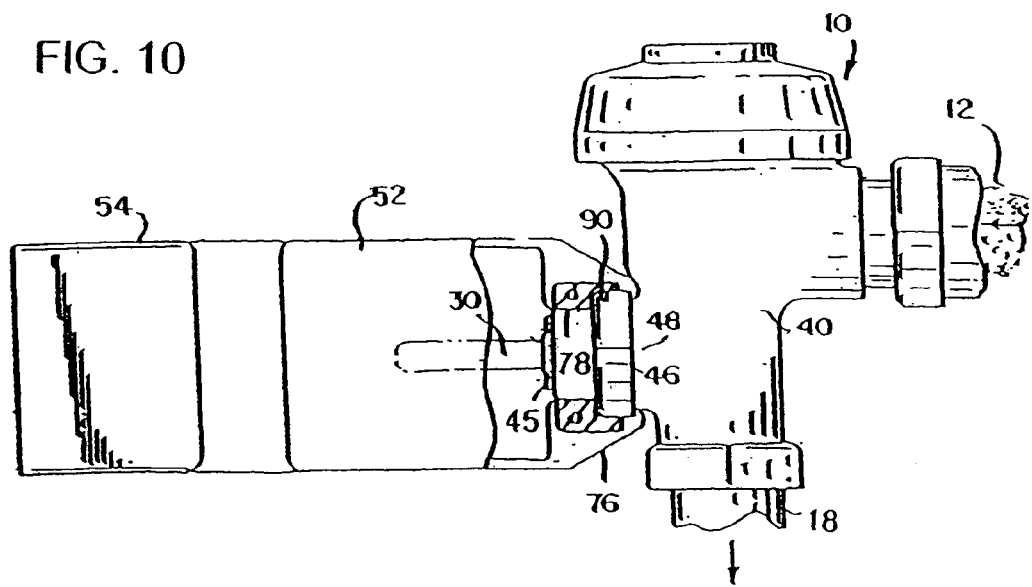
FIG. 10 is an external front elevation partially cutaway view of the automatic flush handle actuation device of the present invention mounted to a standard flushing mechanism, particularly illustrating the flange extension of the handle actuation device housing which abuts a fat surface on the flushing mechanism housing to hold the handle actuation device against rotation.

Referring to FIGS. 1 and 10, flushing mechanism 10 is encased in a housing 40 which has an opening 42 through which flush handle 30 extends. Opening 42 resides in a circular bushing 44 which is removably attached to housing 40 by a threaded nut 46. In most instances, nut 46 has a hexagonally shaped outer surface for engagement by an ordinary open end wrench. Housing 40 includes a pair of external front and back flat portions 48 (FIG. 10) which form part of the casing comprising housing 40. In FIG. 10, only the front flat portion 48 is visible. The back flat portion of the housing is directly behind the front flat portion 40 shown in FIG. 10.

If preferred, the outer surface of bushing 44 surrounding handle 30 may include a circular cushioning surface 45, composed of a hard but malleable plastic composition, to absorb the stresses that occur when the handle 30 is moved to its full stop position and bears against bushing 44.

One embodiment of the automatic flush handle actuation device of the present invention is illustrated in FIGS. 2-6, and is designated generally by the numeral 50. The flush handle actuation device 50 of this embodiment is comprised of two major components, i.e., a modular housing unit 52 and a power/circuit module 54. The housing unit 52 is adapted to be easily mounted onto flushing mechanism housing 40 over flush handle 30 in a manner to be explained. Internally of modular housing unit 52 is a motor 56 which is mechanically connected through a reduction gear train 58 to an actuating or drive element (cam 60) which is mounted by pin 61 on gear 62 of reduction gear train 58. As motor 56 is activated, gear train 58 rotates gear 62 in a counterclockwise direction, as viewed in FIG. 2. Cam 60 moves downward, contacting flush handle 30, moving flush handle 30 downward to the position shown in FIG. 3. A portion of handle 30 comes into contact with bushing 44 for "metal-to-metal" abutment if cushioning surface 45 is not provided. The same portion of handle 30 contacts cushioning surface 45, where provided, in the "full down" position of the handle. The movement of flush handle 30 advances plunger pin 28 to the right against the force of compression spring 38, tilting stem 20 and activating flush mechanism 10. As will be explained in further detail, compression spring 38 (FIG. 1) returns flush handle 30 to the position shown in FIG. 2 after power to motor 56 is cut off.

In one embodiment, motor 56 is rigidly mounted to a side wall 64 of housing 52. Likewise, the elements of gear train 58 are rotatably mounted on shafts having axes 66, 68 and 70, which are rigidly mounted on side walls 64 of housing 52. Any reverse torque applied by spring 38 through flush handle 30 during operation of motor 56 and movement of the flush handle from the position shown in FIG. 2 to the position of FIG. 3 is resisted by the force of cam 60, gear train 58 and motor 56 acting though housing 52. For that reason, the first embodiment of present invention provides a rigid, while readily removable mounting structure between modular housing unit 52 and flushing mechanism housing 40.

Figure 11:
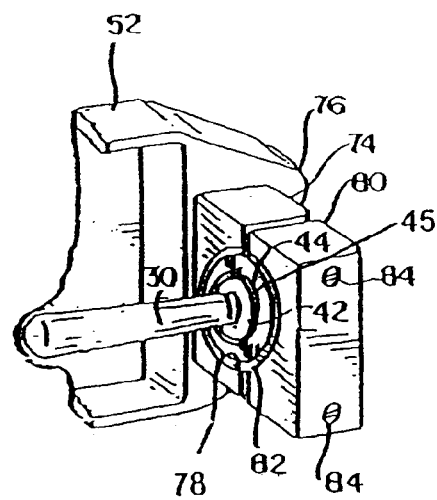
FIG. 11 is a perspective detail cutaway view of a portion of the modular housing unit of the present invention, showing the brackets for mounting the modular housing unit to the flushing mechanism housing.
Figure 22:
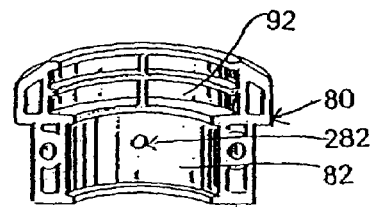
FIG. 22 is a perspective detail view of the cut-out portion of the separate mounting bracket of FIG. 21.

To this end, referring to FIGS. 1, 2, 3, 10 and 11, modular housing unit 52 includes a cradle-shaped mounting bracket 74 rigidly attached near one end of housing 52 which is adapted to be attached to flushing mechanism housing 40. A flange portion 76 (FIGS. 10, 11 and 21) extends from housing unit 52 beyond the location of bracket 74. Bracket 74 includes a semicircular cut-out portion 78 (FIGS. 11 and 21) adapted to fit around half of the outside portion of bushing 44. A separate bracket 80 having a semicircular opening 82 is provided to engage bracket 74 such that opening 82 extends substantially around the remaining half of bushing 44 when modular housing 52 is mounted on flushing mechanism housing 40 (FIGS. 11 and 22). A pair of screws 84 are provided to readily allow bracket 80 to be firmly attached to bracket 74 by use of an ordinary screwdriver.

Figure 9:
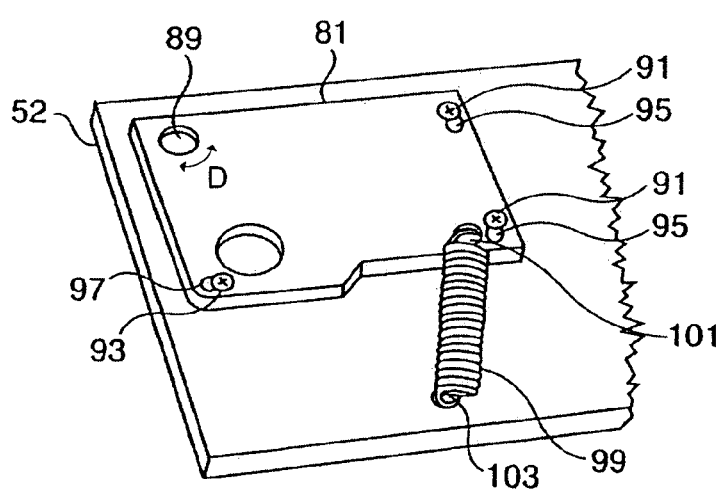
FIG. 9 is a diagrammatic perspective view showing a way of mounting the moveable motor mounting plate to the housing in the second embodiment of the present invention, and of biasing the moveable motor mounting to a first position.
Figure 21:
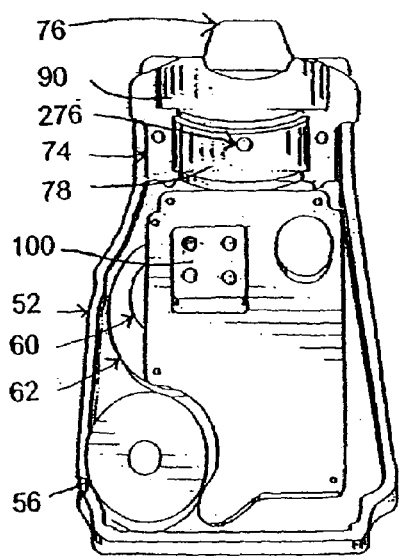
FIG. 21 is an exploded, perspective detail view of the automatic flush handle actuating mechanism of FIG. 20, showing the cut-out portion of the mounting bracket that is rigidly attached near one end of the housing and a removable insert adapted to be disposed therein and to fit around half of the outside portion of the flushing mechanism bushing, the separate mounting bracket adapted to engage the mounting bracket that is rigidly attached near one end of the housing and another removable insert adapted to be disposed therein and to fit around another half of the outside portion of the flushing mechanism bushing.

As best seen in FIGS. 9 and 10, when brackets 74 and 80 mount modular housing 52 to flushing mechanism housing 40, flange 76 extends over and engages the back flat surface 48 of housing 40, thereby preventing modular housing 52 from rotating relative to flushing mechanism housing 40. As shown in FIG. 21, the inside of brackets 74 and 80 include a cutout portion 90, 92, which engages the outer surface of nut 46 and also assists in preventing rotation of modular housing 52 relative to flushing mechanism housing 40. The cutout portions 78 and 82 in brackets 74 and 80 are configured to engage circular bushing 44 to further assist in rigidly mounting modular housing 52 to flushing mechanism housing 40.

Figure 18:
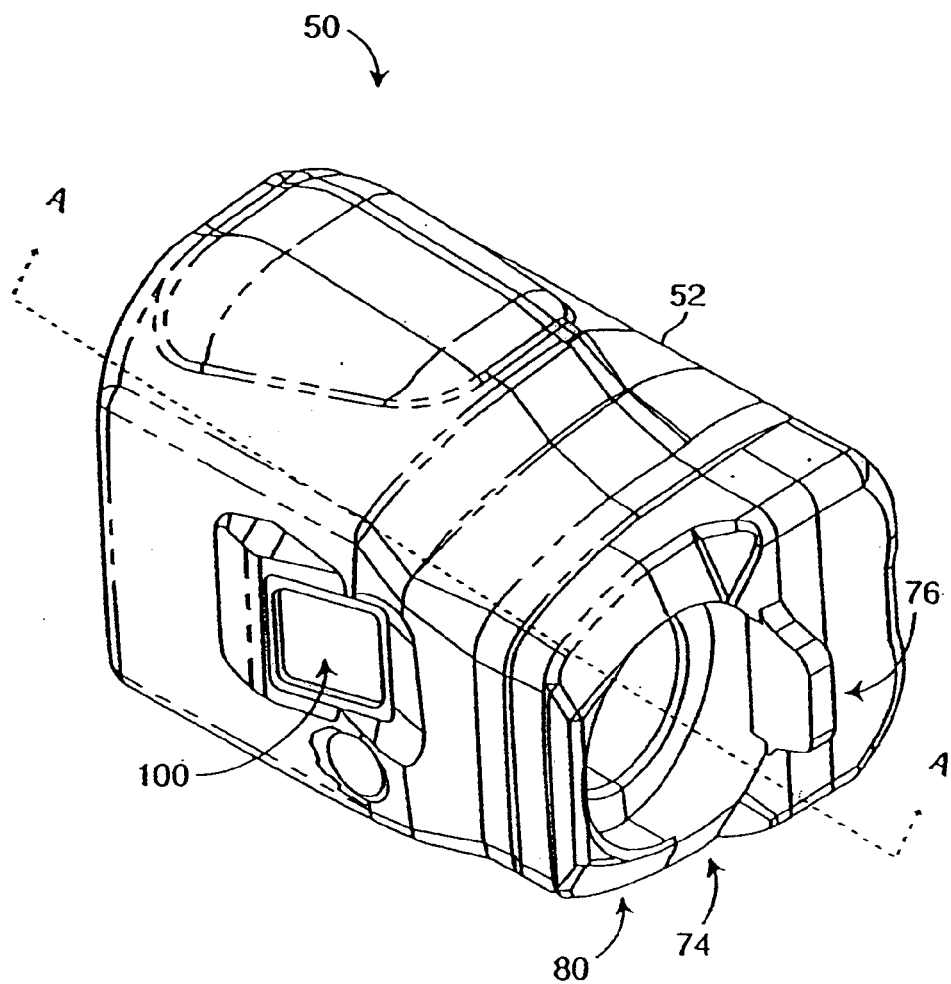
FIG. 18 is a perspective view of the modular housing of another embodiment of the present invention, showing the brackets for mounting the modular housing unit to the flushing mechanism housing.
Figure 19:
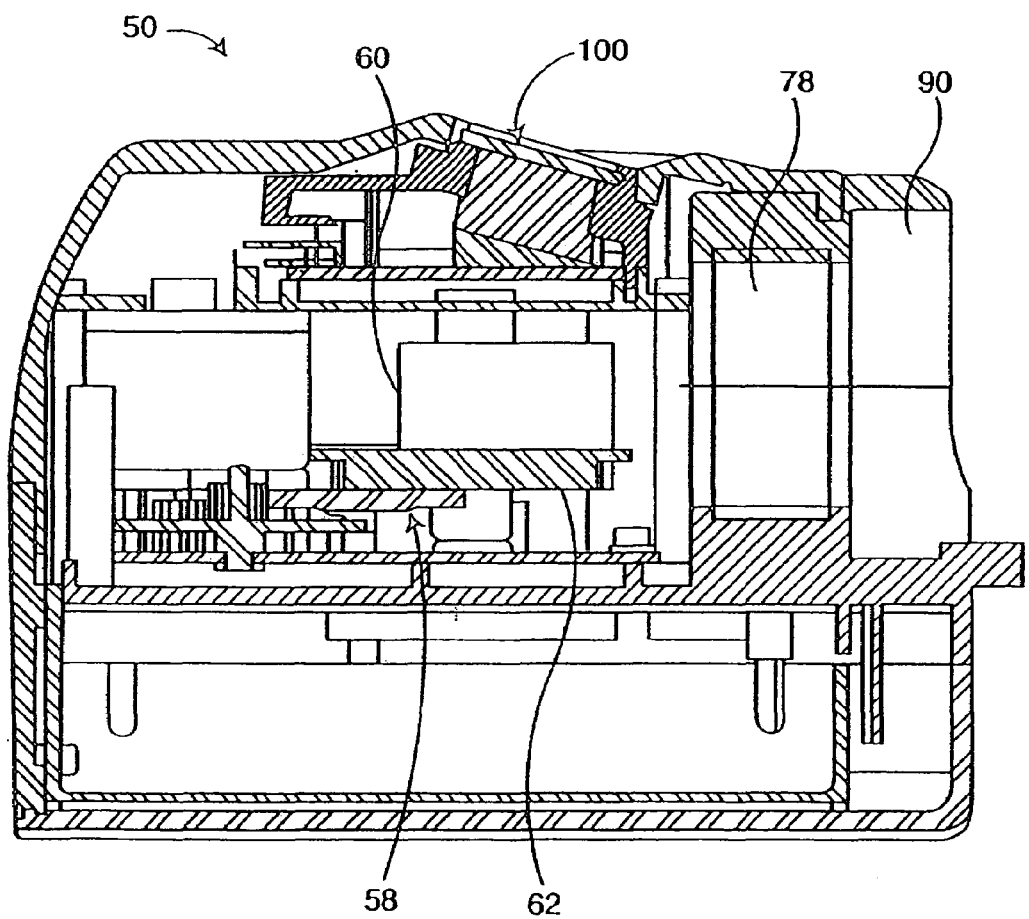
FIG. 19 is a perspective detail cut-away view taken along line A-A of FIG. 18 showing modular housing unit, a bracket for mounting the modular housing unit to the flushing mechanism housing, a cut-out portion adapted to fit around half of the outside portion of a bushing attached to the flushing mechanism housing and a cut-out portion adapted to fit around half of the outer surface of a nut attached to flushing mechanism housing.
Figure 20:
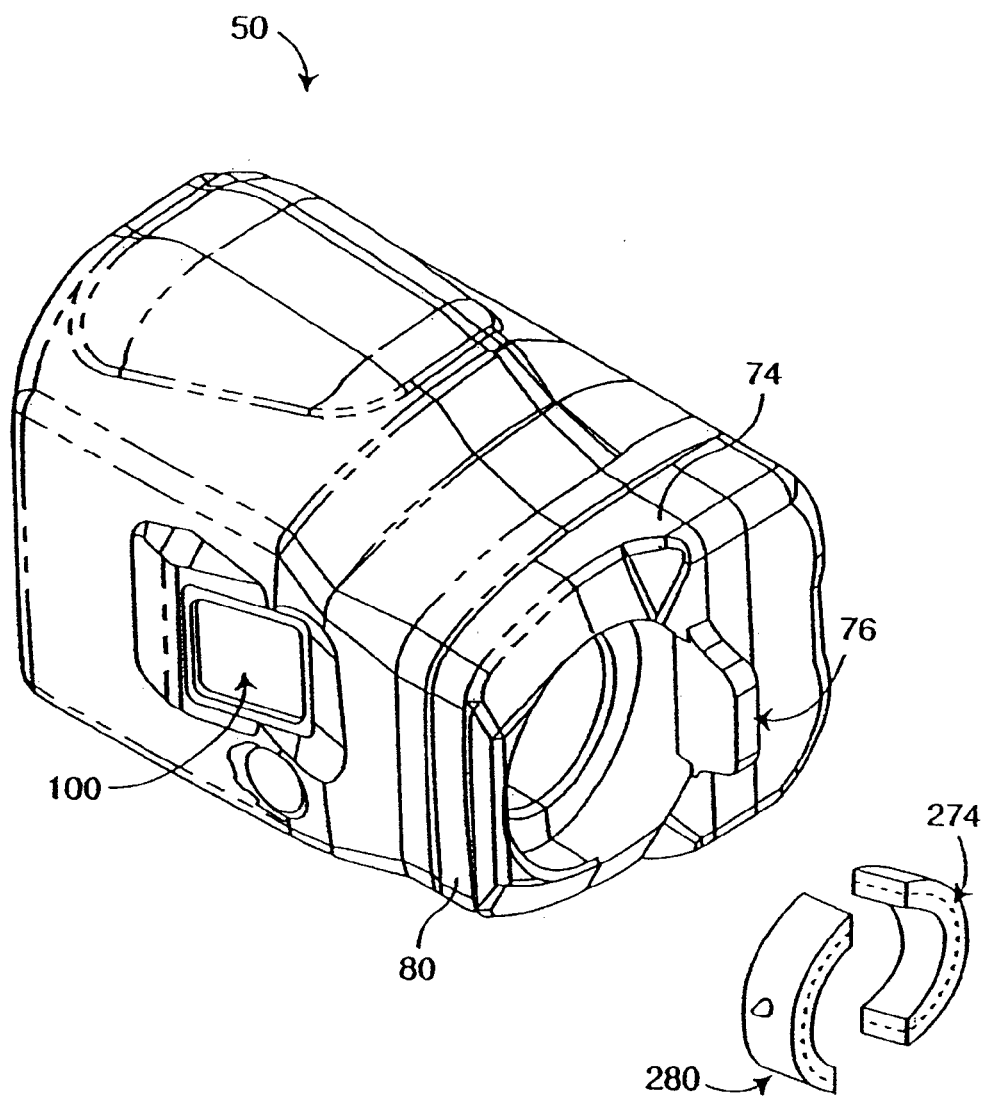
FIG. 20 is a diagrammatic, perspective detail view of another embodiment of the present invention, showing the relationship between the bracket cut-out portions adapted to fit around the outside portion of the flushing mechanism bushing and removable inserts adapted to be disposed within the bracket cut-out portions.

In the embodiment of the invention illustrated in FIGS. 18 and 20, flange 76 is positioned on mounting bracket 74 and is sized to provide about ±30 degrees of rotation relative to the back flat surface of housing 40. Flange 76 may have a length of about 1 inch. With the configuration shown in FIG. 21, the modular housing 52 maybe rotated to adjust the angle of sensor 100 before brackets 74, 80 are firmly secured together. In this manner, the angle of the sensor 100 may be adjusted to accommodate both low and high mount facilities.

Figure 24:
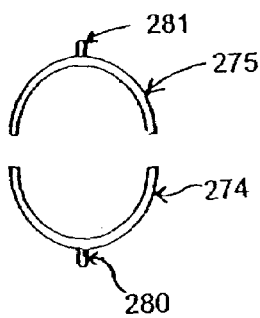
FIG. 24 is a perspective detail view of a removable insert according to an alternate embodiment of the present invention.

In the embodiment of the invention illustrated in FIGS. 20-21 and 24, the automatic flush handle actuating device 50 further comprises a pair of removable inserts 274, 280 adapted to be disposed within the cut-out portions 78, 82 of brackets 74, 80, which engage flushing mechanism bushing 44 (FIGS. 21-22 and 24) to prevent the automatic flush handle actuating device 50 from slipping once the device 50 is mounted and the desired sensor 100 angle is achieved. Referring to FIGS. 21-22 and 24, removable inserts 274, 280 arc adapted to grip the flushing mechanism bushing 44 and may include a pin 275, 281, which removably engages an aperture 276, 282 in bracket 74, 80. The cut-out portions 78, 82 of brackets 74, 80 comprise an aperture 276, 282. Preferably, removable inserts 274, 280 may be formed from rubber, such as neoprene by way of a non-limiting example, or any other suitable material.

Figure 23:
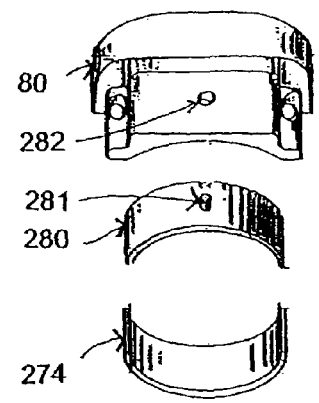
FIG. 23 is a perspective detail view of a removable insert according to embodiment of the invention shown in FIGS. 20 and 21.
Figure 23:
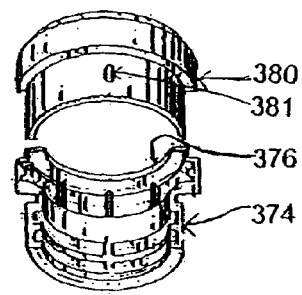

In an another embodiment, removable inserts 374, 380 may be adapted to be disposed within the cut-out portions 90, 92 of brackets 74, 80, which engage the outer surface of threaded nut 46. As shown in FIG. 23, inserts 374, 370 may be disposed within bracket cut-out portions 90, 92 in addition to bracket cut-out portions 78, 82 so that the automatic flush handle actuating device 50 of the present invention is mounted to both the flushing mechanism bushing 44 and the threaded nut 46. Removable inserts 374, 380 may further comprise a pin 375, 381, which removably engages an aperture (not shown) within bracket 74, 80. Removable inserts 374, 380 may be formed from the same materials as inserts 274, 280.

Removable inserts 274, 280, 374, 380 may be formed to have a variety of thicknesses to adapt the automatic flush handle actuating device 50 for mounting over flush valve handles 30 on bushings 44 and/or threaded nuts 46 of different circumferences. As one of ordinary skill in the art may appreciate, by changing the size of the insert, the automatic flush handle actuation device 50 may be mounted on a variety of flushing mechanisms 10, each of which may comprise a flush valve handle 30, a bushing 44 and a flex nut 46 of a different size. Removable inserts 274, 280, 374, 380 may further comprise a lip 376 along one end of the insert for engaging one side of threaded nut 46. Lip 376 may be slightly deformable in order to adjust to different thicknesses and cornered radii of threaded nut 46.

Figure 25:
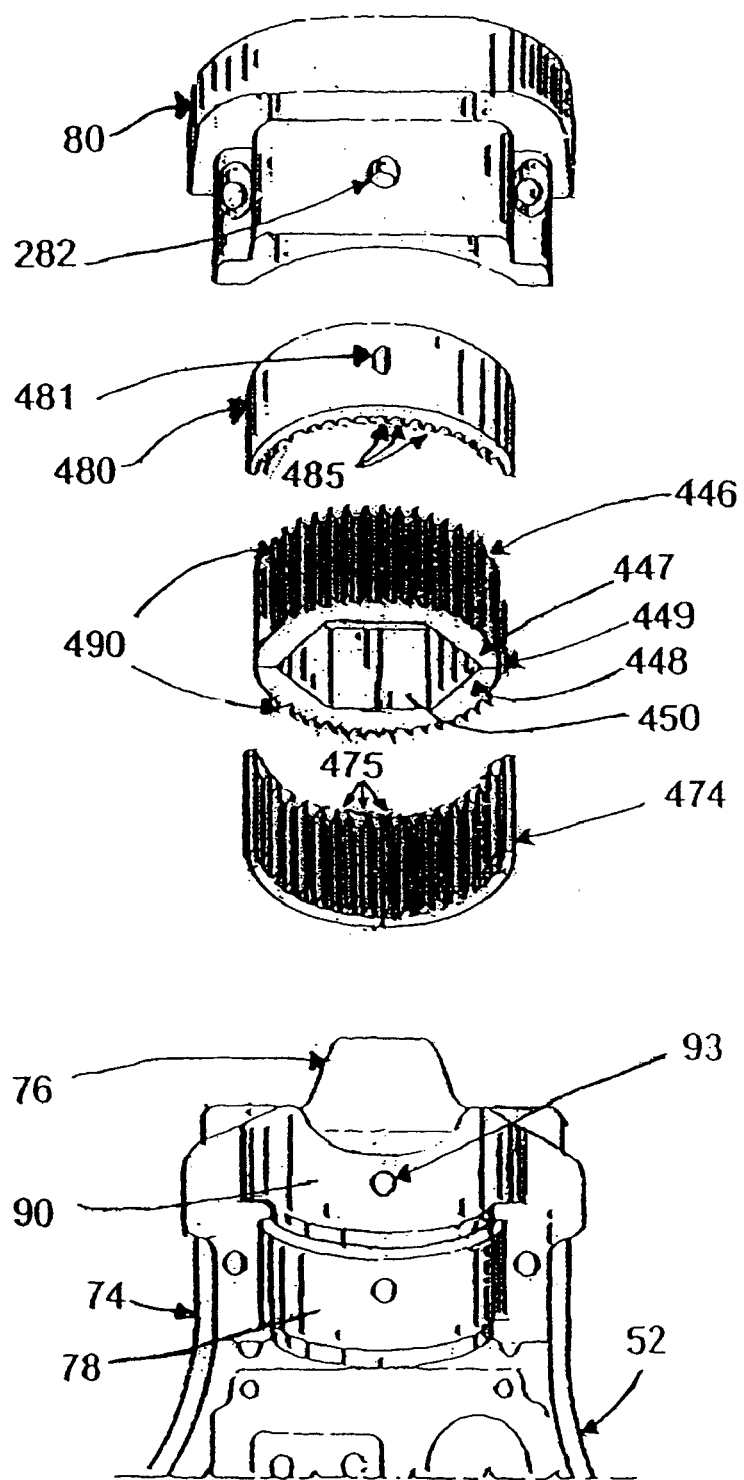
FIG. 25 is an exploded, perspective detail view of an alternate embodiment of the automatic flush handle actuating mechanism of the present invention.

In an alternate embodiment of the invention illustrated in FIG. 25, automatic flush handle actuating device 50 further comprises a pair of removable inserts 474, 480 adapted to be disposed within the cut-out portions 90, 92 of brackets 74, 80 and a nut bushing 446 configured to be mounted on threaded nut 46. Each removable insert 474, 480 comprises a series of detents or serrations 475, 485 along an inner surface thereof. Each removable insert 474, 480 may comprise a pin 475, 481, which detachably engages an aperture (not shown) within the cut-out portions 90, 92 of brackets 74, 80. The removable inserts 474, 480 may be formed of a hard but malleable plastic composition.

As shown in FIG. 25, the nut bushing 446 may comprise two nut bushing half-portions 447, 448 secured together with each nut bushing half-portion 447, 448 comprising a nut cut-out half-portion as shown in FIG. 25. The two nut bushing half portions 447, 448 may be secured together by a bead, or strip, 449 as is known in the molding art. When nut bushing half portions 447, 488 are secured together, the nut cut-out half-portions form a nut cut-out portion 450 configured to engage nut 46. Alternatively, the nut bushing 446 may comprise a single piece construction comprising a nut cut-out portion 450 configured to engage nut 46. The nut bushing 446 may be formed of a hard but malleable plastic composition.

The nut bushing 446 further comprises a series of detents or serrations 490 along at least a portion of the periphery thereof. Detents 490 align with the detents 475, 485 along inserts 474, 480. Preferably, the series of detents 490 extend along the periphery of the nut bushing 446 for a range sufficient to index the automatic flush handle actuating device 50 over the nut 46 to provide ±15 degrees of rotation relative to the back flat surface of housing 40. The ability to index removable inserts 474, 480 over nut bushing 446 provides a finer degree of control of the sensor angle achieved by mounting the automatic flush actuating device 50 to the flushing mechanism housing 40.

Figure 2:
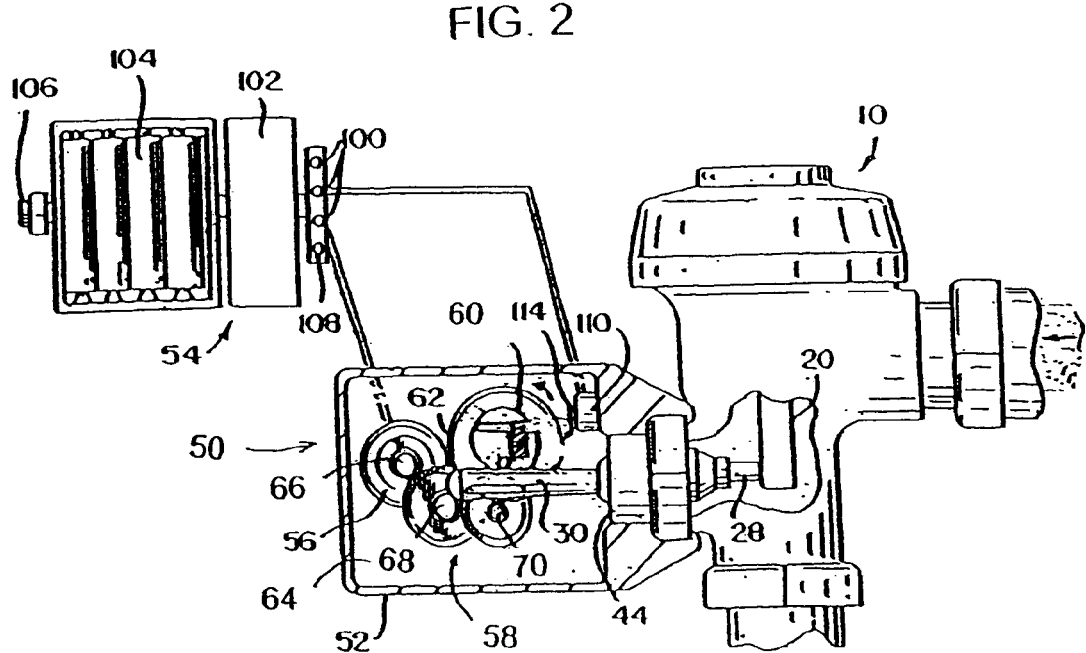
FIG. 2 is a schematic view of one embodiment of the automatic flush handle actuating mechanism of the present invention showing one placement of the power/circuit module, the actuating module, and the flush valve, with the handle actuating mechanism in a de-actuating position.
Figure 3:
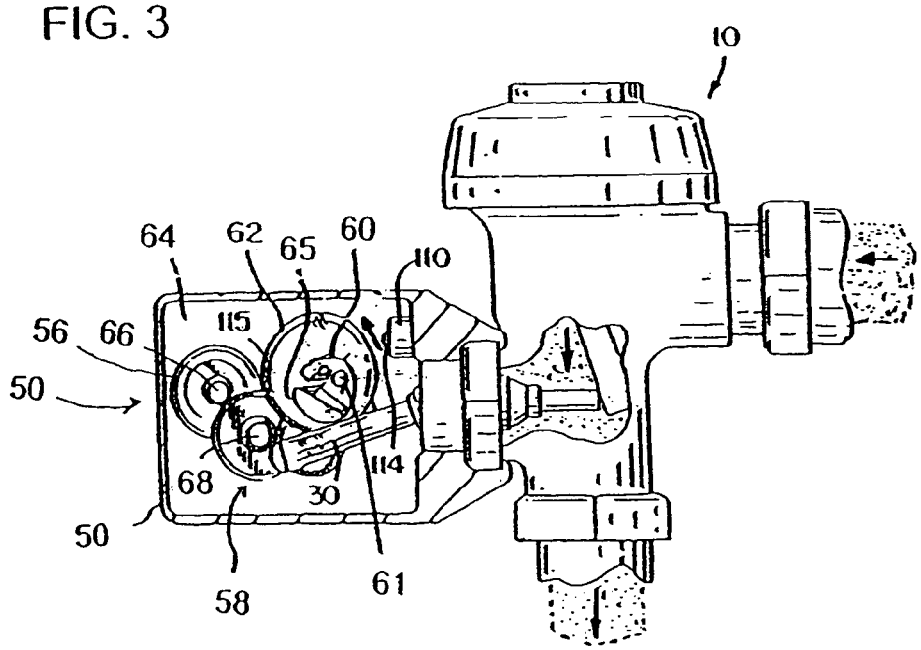
FIG. 3 is a schematic view of the flush handle actuating mechanism of FIG. 2, without the power/circuit module and showing the handle actuating mechanism in its actuation position.

In the embodiment of the invention illustrated in FIGS. 2-6, cam 60 is rigidly fixed to gear 67, and rotates eccentrically as gear 62 rotates counterclockwise (arrow A) as seen in FIGS. 2 and 3 when motor 56 is energized. As best seen in FIGS. 4-6, cam 60 includes a main body portion 63 and a flexible body portion 65, the body and flexible portions being separated and joined by a hinge portion 67. A space 69 is provided between main body portion 63 and flexible body portion 65 of cam 60, and a spring 71 or other suitable biasing element is suitably lodged in a channel 73 provided partly through main body portion 63 of cam 60. Spring 71 extends outward from channel 73, and the top surface of spring 71 abuts an inner surface 75 of flexible body portion 65, and biases the flexible body portion outwardly and away from main body portion 63 of cam 60. Hinge portion 67 comprises a strip of the material from which cam 60 is composes, and provides resistance to excessive movement of flexible body portion 65 away from main body portion 63 under the force of spring 73.

FIG. 4A illustrates an alternate flat-type spring 77 that can be inserted in space 69 in place of spring 71. The upper and lower flanges 79, 810 of flat spring 77 are adapted to fit into corresponding slots (not shown) disposed in face 75 of flexible body portion 65, and in face 83 of main body portion 63 of cam 60. The outer circumference of cam 60 is substantially circular when the cam is in its non-operative mode, as seen in FIG. 4. The lower end of cam 60 is adjacent to, and not necessarily in contact with the outer surface of flush handle 30, as illustrated by the gap B, in the non-operative mode of cam 60.

In operation, referring to the embodiment of FIGS. 2-6, upon energization of motor 56, gear 62 is rotated counter clockwise through reduction gear train 58, and cam 60 begins to rotate eccentrically, as seen in FIGS. 4-6. After rotating counterclockwise through a short arc, the circumference of cam 60 contacts handle 30, and begins to push handle 30 downward until handle 30 abuts an edge of bushing 44 as cam 60 continues to rotate. At this point, handle 30 reaches its "full stop" position, and causes a flushing action as described previously.

Cam 60 continues to rotate after handle 30 has reached its full stop position (FIGS. 5, 6). As seen in FIG. 5, hinge 67 is located on cam 60 beyond the point of contact between cam 60 and handle 30 when handle 30 reaches its full stop position. As cam 60 continues to rotate in the counterclockwise direction, as seen in FIG. 6, handle 30 cannot move downward any further. Thus, handle 30 exerts a force on flexible body portion 65 of cam 60 which moves the flexible body portion 65 toward main body portion 63, closing gap 69 and compressing spring 71. As cam 60 continues to rotate, the outer circumference of flexible body portion 65 eventually moves out of contact with handle 30, and the outer circumference of main body portion of cam 60 contacts handle 30. The relative dimensions of cam 60 and the location of pin 61 are designed to allow handle 30 to move upward under the force of spring 38 (FIG. 1) as cam 60 rotates beyond its position shown in FIG. 6 until the cam 60 and handle 30 movement completes one cycle of operation, and the cam and handle return to their respective inoperative positions show in FIG. 4. As cam 60 rotates from the position shown in FIG. 6 to the inoperative position shown in FIG. 4, flexible body portion 65 moves away from main body portion 63 of cam 60 under the force of spring 71.

The flexure built into cam 60 through the width of gap 69 and spring 71 allows the cam to continue its rotation beyond the point where handle 30 has reached its full stop position, regardless of where that full stop position is. This prevents stalling of cam 60 and motor 56 as the cam continues to rotate subsequent to handle 30 reaching its full stop position.

Figure 7:
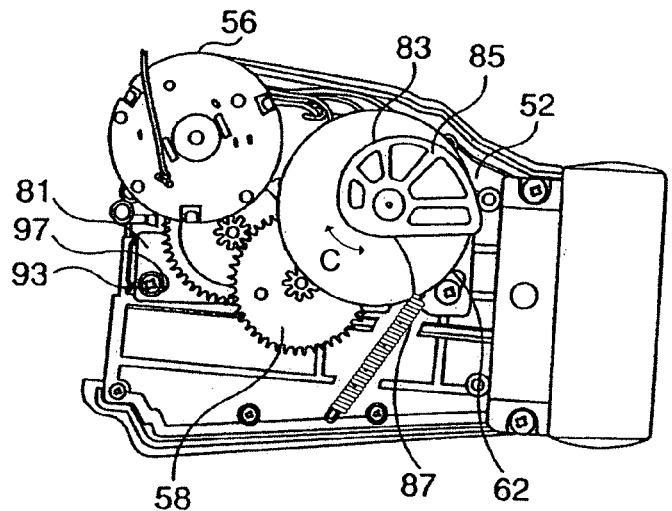
FIG. 7 is a top perspective view of the housing, moveable motor mounting plate and cam drive forming part of a second embodiment of the present invention.
Figure 8:
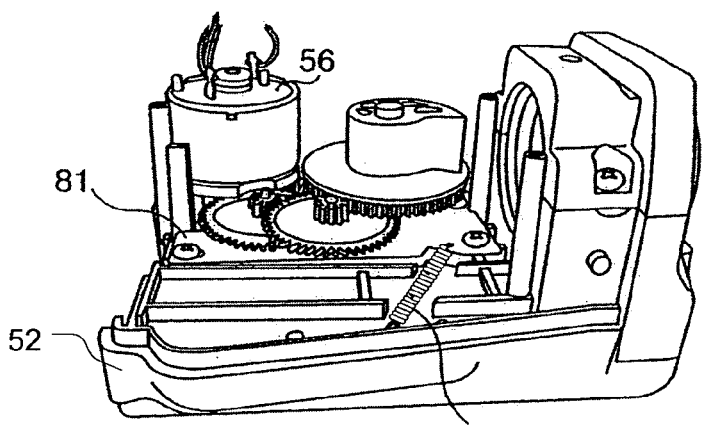
FIG. 8 is a side perspective view of the housing and moveable motor mounting plate, with the cam removed, of the second embodiment of the present invention.

Another embodiment of the drive mechanism for handle 30, which drive mechanism includes flexure to prevent stalling of motor 56 when handle 30 reaches its full stop position, is illustrated in FIGS. 7-9. In this embodiment, motor 56 is mounted on a laterally moveable support plate 81, and the gears forming reduction gear train 58 are also rotatably mounted on moveable support plate 81. A cam 83 (FIG. 7) is mounted for rotation with gear 62 in a counterclockwise direction when motor 56 is activated. Cam 83 includes a first surface portion 85 of increasing diameter in the direction of rotation (arrow C), and a second somewhat flat surface portion 87 of decreasing diameter in the direction of rotation of cam 83.

As seen in FIG. 9, moveable support plate 81 of the illustrated embodiment is pivotally mounted by pin 89 to housing unit 52 to move in a relatively small arc around pin 89, shown by arrow D. Pins 91 and 93 extend to housing unit 52 through slightly arcuate slots 95 and 97 in moveable support plate 81 to allow plate 81 to pivotally move in a small arc around pin 89 (arrow D). A spring 99, or other suitable tension device, is attached at one end to plate 81 at pin 101, and to housing 52 at pin 103, to bias moveable plate 81 in a clockwise direction around pin 89.

The operation of the second embodiment of the invention disclosed in FIGS. 7-9 is best explained with reference to FIGS. 12-14. In the inoperative position of the second embodiment (FIG. 12), cam 83 is in the position shown, with second cam surface 87 substantially parallel to and a slight distance from flush handle 30. If desired, and if the thickness of handle 30 dictates, second cam surface 87 of cam 83 may abut handle 30. Spring 99 urges moveable plate 81 to the position shown in FIG. 12.

Figure 13:
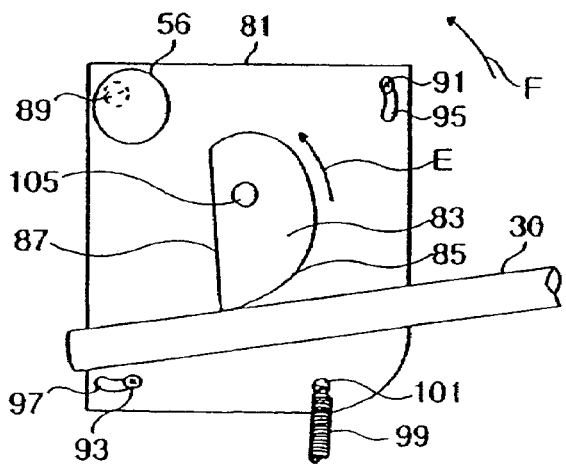
FIG. 13 is a diagrammatic view of the relationship between the flush handle, cam and moveable support plate when the flush handle has moved to its full stop position in the embodiment of the invention shown in FIGS. 7-9.

Upon activation of motor 56, cam 83 rotates in a counterclockwise direction (arrow E), first cam surface 85 contacts flush handle 30 and drives handle 30 to its full stop position, as diagrammatically shown in FIG. 13. As handle 30 reaches it full stop position, cam 83 continues to rotate as flushing action occurs. Since handle 30 cannot move, the force between handle 30 and cam 83 is transferred through gear train 58 to moveable support plate 81, upon which gear train 58 and earn 83 are mounted. This force causes moveable plate 81 to rotate counterclockwise (arrow F) through a relatively small arc around pin 89 against the bias of spring 99 until the moveable plate 81 is in the position shown in FIG. 13. This increases the distance between the center of rotation 105 of cam 83, and the outer surface of handle 30, and allows cam 83 to continue its counterclockwise rotation without stalling motor 56.

Figure 12:
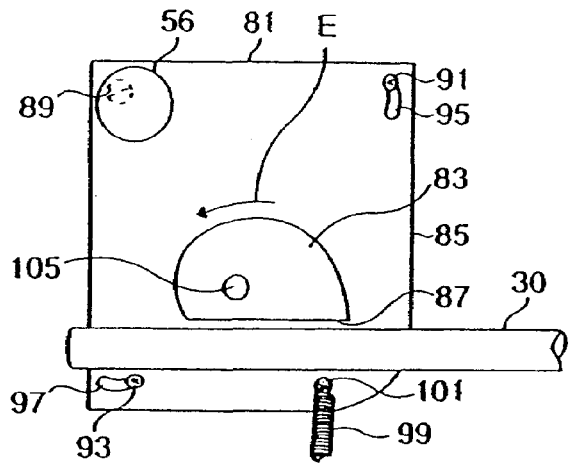
FIG. 12 is a diagrammatic view of the relationship between the flush handle, earn and moveable support plate in the non-operative position of the embodiment of the invention shown in FIGS. 7-9.
Figure 14:
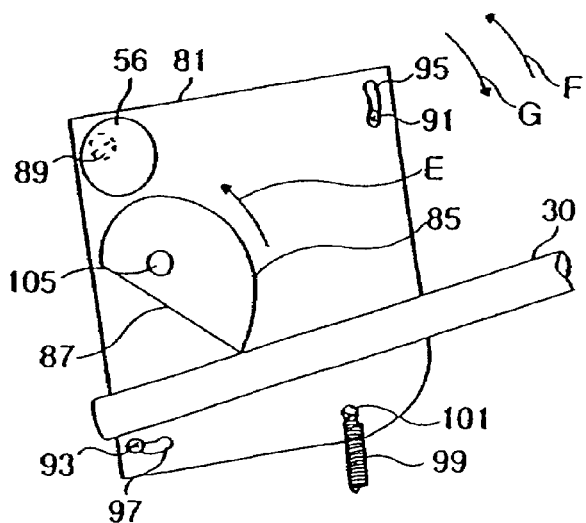
FIG. 14 is a diagrammatic view of the relationship between the flush handle, cam and moveable support plate as the cam continues to rotate beyond the full stop position and back to the non-operative position of the embodiment of the invention shown in FIGS. 7-9 and 12.

When cam 83 reaches the position shown in FIG. 14, handle 30 starts to move upward to return to its non-operative position (FIG. 12). The force between handle 30 and cam 83 diminishes, and moveable support plate 81 rotates clockwise (arrow G) about pin 89. As cam 83 continues to rotate, moveable plate 81, cam 83 and handle 30 ultimately return to the position shown in FIG. 12. The flush operating mechanism is ready to initiate a new cycle of operation when motor 56 is again actuated.

An example of the operation of moveable support plate 81 relative to housing unit 52 will be explained. Assume the maximum torque required to fully flush the highest torque handle 30 assembly (due to high water pressure) and move handle 30 to its full stop position is 15 foot-pounds. The tension on spring 99 is set higher than the maximum torque to reach the full stop position of the handle 30, but less then the torque developed by the motor 56 and cairn 60. In the present example, assume the maximum torque developed by the cam and motor at low batteries is 25 foot-pounds. In this example, the tension on spring 99 is established to provide a torque of 20 foot-pounds. As a result, the moveable support plate 81 and cam 60 develop more than sufficient torque to drive even the highest torque flush handle 30 to its fill stop position (FIG. 3). When handle 30 reaches its full stop position (in those assemblies where this position is reached), the added torque in the motor drives the moveable support plate 81 to pivot about pin 89, (FIG. 13) allowing cam 60 to rotate a full 360 degrees. At the end of the rotation of cam 60, moveable support plate 81 has returned to its inoperative position (FIG. 12).

Operation of the automatic flush handle actuation device 50 occurs under any of a number of predetermined events. One such event is use of the sanitary unit. Another event may be non-use of the sanitary unit for some predetermined time period. Upon the occurrence of one of the predetermined events, a signal generating means activates the automatic flush handle actuation device 50.

Referring to FIG. 2, one signal generating means includes a sensor for detecting use of the sanitary facility. The sensor may be a motion detector, infrared sensor, or a body heat detector, all designated 100. Upon detection of use by the sensor, an electronic control means (circuit board 102) interconnected between a power source 104 and drive mechanism 50 within the modular housing unit 52 provides a pulse of electrical energy to the motor 56 of such duration as to rotate the gear 62 through 360 degrees, at which point power to motor 56 is cut off, and spring 38 (FIG. 1) raises handle 30 upward to its closed position, as previously described. In one embodiment, power source 104 constitutes one or more battery units (four shown), whereby no outside electrical power is required to operate motor 56.

Other signal generating means include a user button 106 or an interval tuner on circuit board 107 set to periodically activate the automatic flush handle actuation device 50 during the evening hours when use of the sanitary unit would in infrequent. In the case of the interval timer, a day/night sensor 108 maybe provided to deactivate the timer during daytime hours.

Figure 15:
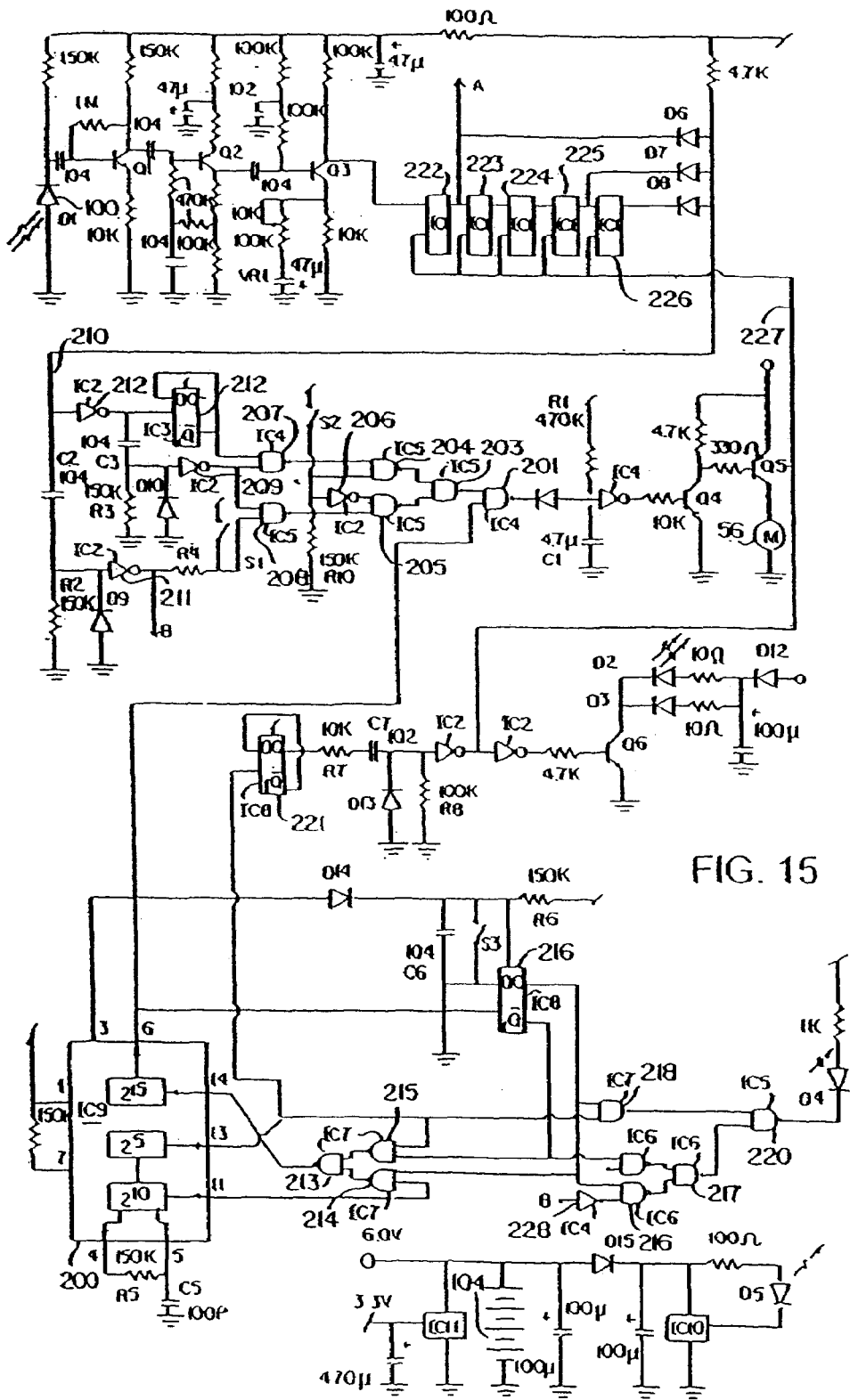
FIG. 15 is a circuit diagram of the power/circuit module of the present invention.

Control of automatic flush handle activation device 50 under an embodiment of the invention can be best understood by reference to the circuit diagram of FIG. 15 and by reference to the parts list of TABLE 1:

TABLE 1

| | |
|---|---|
| IC1: | PC74HC74, CMOS, PHILIPS OR EQUIVALENT |
| IC2: | N74HC04, CMOS, MITSUBISHI OR EQUIVALENT |
| IC3.8: | PC74HC74, CMOS, PHILIPS OR EQUIVALENT |
| IC4: | HD74HC04, CMOS, HITACHI OR EQUIVALENT |
| IC5, 6, 7: | HD4HC00, CMOS, HITACHI OR EQUIVALENT |
| IC9: | BJ-101, CMOS ASIC, HOLTEK MICRO ELECTRONICS |
| IC10: | 7044A, 4.4 V VOLTAGE DETECTOR, HOLTEK MICRO ELECTRONICS |
| IC11: | 1033, 3.3 V VOLTAGE DETECTOR, HOLTEK MICRO ELECTRONICS |
| D1: | INFRARED PHOTO DIODE |
| D2, 3: | INFRARED EMITTING DIODE, 5 MM DIAMETER |
| D4: | RED LED, 5 MM DIAMETER |
| D5: | GREEN LED, 5 MM DIAMETER |
| D6-15: | IN414148 SWITCHING DIODE |
| Q1, 3, 4: | 2SC945 NPN TRANSISTOR OR EQUIVALENT |
| Q2: | 2SA733 PNP TRANSISTOR OR EQUIVALENT |
| Q5: | 2SB562 PNP TRANSISTOR OR EQUIVALENT |
| Q6: | 2SD965 NPN TRANSISTOR OR EQUIVALENT |

Activation of the motor 56 of FIG. 15 under one embodiment occurs upon receipt of an activation signal from either of two possible signal sources: (1) an output from a motion or infrared or other sensing detector 100 indicating use of the sanitary facility; or (2) an output of a timer 200. An output from either source results in an activating signal to the motor 56 through a controlling "NOR" gate 201.

For the motor 56 to remain in a deactivated state, the controlling NOR gate 201 must have a logical 0 on each input. A logical 0 at both inputs or NOR gate 201 results iii a logical 1 at the output of the NOR gate 201 and a 0 at the output of the inverter 202. A 0 at the output of the inverter 202 causes transistors Q4 and Q5 to remain in a non-conductive state resulting in no voltage being applied to the motor 56.

A logical 0 at both inputs of the NOR gate 201 causes a capacitor C1 of a resistor-capacitor (RC) timing circuit, R1 and C1, to charge to a supply voltage value (3.3V). The momentary application of a positive-going pulse to either input of the NOR gate 201 causes the capacitor C1 of the RC timing circuit to rapidly discharge to 0. A logical 0 at capacitor C1 and at the input to the inverter 202 causes the activation of the motor 56 through transistors Q4 and Q5. The time of activation of the motor 56 is determined by the charging time of the RC timing circuit R1, C1 after the input of the NOR gate 201 has returned to 0.

The occasion for the generation of the positive-going pulse at the input of the NOR gate 201 from the sensor 100 is determined by the state of mode switches S1 and S2. When the mode switches S1, S2 are in the state shown in FIG. 15, (sanitary mode), the motor 56 will be activated both when a user approaches the sanitary facility and when the user leaves the sanitary facility. When only switch S1 is closed (normal mode) the motor 56 will be activated only once for each use of the sanitary facility. When only switch S2 is closed, the motor 56 will only be activated after every other use of the sanitary facility.

With switches S1 and S2 in the sanitary mode (S1 and S2 as shown in FIG. 15), a logical 0 is applied to one input of NAND gate 204 due to the open state of the switch S2 and because resistor R10 pulls the input to a very low value. The 0 at one input of the NAND gate 204 blocks the passage of any control signals from the sensor 100 though the NAND gate 204. Conversely, the logical 0 from switch S2 causes a logical 1 on NAND gate 205 though inverter 206. The logical 1 on one input of NAND gate 205 allows the passage of control signals from the sensor 100 to the controlling NOR gate 201 through NAND gate 203, 205 and 208.

With the sensor 100 in a deactivated state, a logical 0 is maintained on interconnect 210. The logical 0 on interconnect 210 results (after a time period) in logical 0's on the inputs of inverters 209 and 211 as well. The logical 0's on the inputs of inverters 209 and 211 causes logical 1's to be applied to the inputs of NAND gate 208 and, consequently, a logical 0 at the input of the controlling NOR gate 201.

Upon activation of the sensor 100, caused by the approach of a user to the sanitary facility, the interconnect 210 rises to a logical 1. The change of interconnect 210 to a logical 1 causes a negative-going pulse to emanate from the output of inverter 211. The negative-going pulse is transferred to the controlling NOR gate 201 causing activation of the motor 56 through NAND gates 208, 205 and 203. The duration of the negative-going pulse from inverter 211 is determined by resistance and capacitance values of a second RC timing circuit R2, C2.

Likewise, when the user of the sanitary facility leaves (causing deactivation of the sensor 100), a second negative-going pulse emanates mom the output of inverter 209. The duration of the second negative-going pulse is determined by resistance and capacitance values of the third RC timing circuit R3, C3.

When the switches S1, S2 of the automatic flush handle activation device 50 are changed to the normal mode (S1 closed; S2 open), the first negative-going pulse is dissipated across resister R4 into the power supply (3.3V) through switch S1. Placing the automatic flush valve activation device 50 in the normal mode causes the motor 56 to be activated only once for each use of the sanitary facility (when the user walks away thereby causing the sensor 100 to become deactivated) by a negative-going pulse from inverter 209 through NAND gates 208, 205, 203.

When the automatic flush handle activation device 50 is placed in the water saver mode (S2 closed), the motor 56 is activated (sanitary facility flushed) only after every other use of the sanitary facility. Activation of the motor 56 after every other use is accomplished by rerouting the activation signal from a path through NAND gates 208, 205 and 203 to a path through NOR gate 207 and NAND gates 204 and 203. Rerouting is accomplished by placing a logical 1 on one input of NAND gate 204 through switch 52 and by placing a logical 0 on NAND gate 205 through use of switch 52 and inverter 206. The application of a logical 0 on one input of NAND gate 205 blocks signal flow though NAND gate 205. The application of a logical 1 to one input of NAND gate 204 allows signal flow through NAND gates 204 and 203 from NOR gate 207.

NOR gate 207 provides a logical 1 output only when both input signals become a logical 0. Inverter 209, as explained above, provides a negative-gong pulse each time the sensor transcends to a deactivated state. D flip-flop 212, on the other hand toggles between a set and a reset state each time the sensor 100 is activated. Each time the flip-flop 212 is in a reset state when the sensor 100 is activated, the output of the flip-flop 217 (logical 1) blocks (at NOR gate 207) the negative-going pulse from inverter 212. The net result of blocking every other pulse is that whenever the switch S2 is closed, that motor 56 is activated (sanitary facility flushed) only once for each two uses of the sanitary facility.

Turning now to the timing circuit 200, an output activating the motor 56 is provided at the controlling NOR gate 201 from the timing circuit 200 every four hours. The output is provided by dividing a 75 kilo Hertz (kHz) signal within $2^{10}$, $2^5$, and $2^{15}$ counters. The 75 kHz signal is generated by an oscillator consisting of the $2^{10}$ counter and a resistance-capacitance network R5, C5. The 76 kHz signal is reduced in frequency within the $2^{10}$ and $2^5$ counters of timer circuit 200 and routed through NAND gates 215 and 213 before being reduced to a four hour signal within the $2^{15}$ counter of the timer circuit 200.

Upon insertion of batteries into the power unit 104 of the automatic flush handle activation device 50, a D flip-flop 216 is placed into a set state by the Interaction of a capacitor C6 and a resister R6. Placing the D flip-flop 215 into a set state provides a calibration interval (7.5 minutes) for adjustments to a variable resistor, VR1, controlling the sensitivity of the sensor 100. During normal operation, adjustments may be made to the sensitivity of the sensor 100 by pushing a calibration button S3.

During the calibration interval, a logical 0 on the Q output of the D flip-flop 216 blocks signals passing from that $2^5$ counter to the $2^{15}$ counter at NAND gate 215. A logical 1 on the Q output of the D flip-flop 216 allows a signal to pass directly from the $2^{10}$ counter to the $2^{15}$ counter via NAND gates 214 and 213. An output of the $2^{15}$ counter is then applied to toggle input resetting D flip-flop 216 after 7.5 minutes.

To aid in the calibration of the sensor 100 during the calibration interval, a light emitting diode (LED) D4 provides visual indication that a user is within range of the sensor 100. A negative-going pulse, B, caused by activation of the sensor 100 is gated during the calibration interval by the Q output of the D flip-flop 216 to the LED D4 via inverter 228 and NAND gates 216, 217 and 220. After the calibration interval, a second output, A, providing visual indication from the sensor 100 is gated to the LED D4 by the Q output of the D flip-flop 216 via NAND gates 219, 217 and 220.

In one embodiment, operation of the sensor 100 is facilitated through use of two infrared transmitters D2, D3. A 2.27 Hz signal from an output of the $2^5$ counter of the timing circuit 200 is divided in half within a D flip-flop 221 and is shaped within an RC network, R7, C7 before application to transmitting diodes D2 D3 via transistor Q6.

When a user approaches the sanitary facility, infrared light from the transmitting diodes D2, D3, reflected from the user is detected by the sensor 100 and amplified by transistors Q1-Q3. The amplified signal is then shifted across shift registers 221-276 by the 1.15 Hz signal 227 also applied to the transmitting diodes D2, D3. Output signals from the sensor 100 are expanded and delayed within the shift register 221-226 before application to the interconnect 210 via diodes D6, D8.

Figure 16:
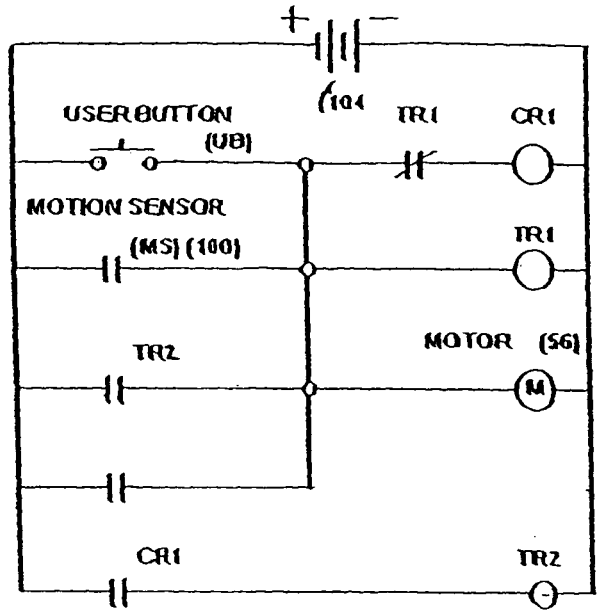
FIG. 16 is a circuit diagram of the power/circuit module under another embodiment of the present invention.

Control of the automatic flush handle activator device 50 under an alternate embodiment may be understood by reference to the circuit diagram of FIG. 16. The motor 56 of the modular housing unit 52 as described above maybe activated by any one of three possible events: (1) activation by a user of the user button 106; (2) activation of a motion or pressure sensor 100; or (3) expiation of a time interval programmed into the Interval Timer TR2 (FIG. 16). The interval timer may be used during extended periods of inactivity (e.g. every two hours) to activate the flushing mechanism 50. After each event, a normally-closed contact CR1 would reset the timer TR2 for activation after another Following activation of the motor 56 by a signal generating means, bridging contact CR1 is closed across the signal generating means electric contact to maintain power on the motor 56 for sufficient time for the gear 62 of the reduction gear train 58 to rotate through 360 degrees. Cycle timer TR1 is programmed to allow sufficient time for such rotation before deactivating the motor 56. Rotation of the gear 62 through 360 degrees allows the cam 60, attached to the gear 62, to move the flush handle 30 from a first position (FIG. 2) to the second position (FIG. 3). As cam 60 completes 360 degrees of rotation, the cycle timer TR1 times out, deactivating the motor 56, at which time the spring 38 within the flushing mechanism 10 has returned the flush handle 30 to the first position (FIG. 2) as described above.

Rotational positioning of the gear 62 and cam 60 may be provided by a sensor activating element 114 rigidly mounted to the periphery of the gear 62. when the gear 62 is in a first position the position sensor 110 is activated by the sensor activating element 114. When the gear 62 rotates out of the first position, the position sensor 110 becomes deactivated until the gear 62 (and sensor activating element 114) again returns to the first position.

Figure 17:
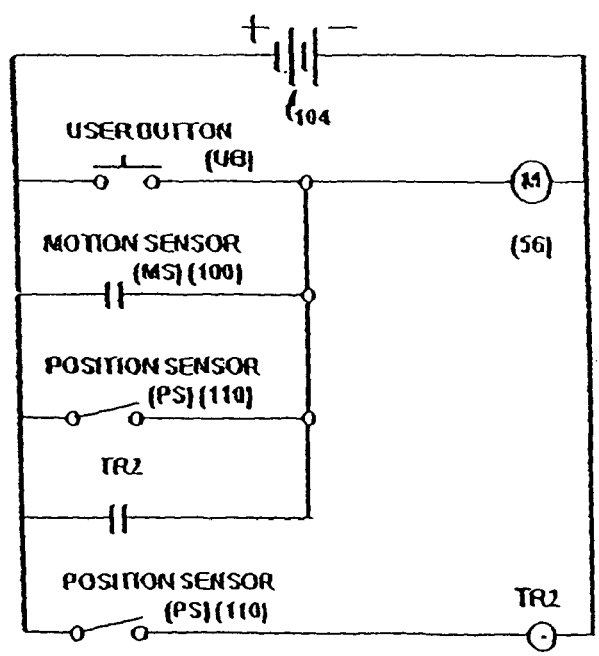
FIG. 17 is a circuit diagram of the power/circuit module under another embodiment of the present invention.

FIG. 17 is an alternate embodiment circuit diagram of the power/circuit module 54. The two contacts of the position sensor 110 (normally-open and normally-closed) of FIG. 17 are shown in the deactivated state (sensor activating element 114 not activating the position sensor 110).

As shown in FIG. 17, whenever the position sensor 110 is deactivated by movement of sensor activating element 114 away from the position sensor 110, the motor 56 will continue to rotate until the sensor activating element 114 again engages the position sensor 110. Events that will cause the position sensor 110 to become deactivated include: (1) activation of the user button 106; (2) activation of the motion or pressure sensor 100; or (3) timeout of the timer TR2. Upon deactivation of the position sensor 110 because of any of the three events, the gear 62 and cam 60 will rotate through one complete revolution. Where deactivation of the position sensor 110 is caused by timeout of the tuner TR2, the rotation of the cam 60 will also reset the timer TR2 through operation of the normally open set of position sensor 10 contacts.

As demonstrated, the automatic flush handle activation device of the described embodiments of the present invention provides an easy-to-install, reliable means of flushing sanitary devices without direct user intervention. Such means is provided without the help of a skilled craftsman or outside power sources. The use of a two-piece coupling member allows the automatic flush handle activation device to be attached to existing plumbing fixtures without concern for service interruptions or damage to the existing plumbing fixtures due to twisting forces inherent in prior art devices. Also, the two-piece coupling member allows the flush handle activation device of the present invention to be easily removed and replaced, if necessary.

The foregoing specification describes only the preferred embodiments of the invention as shown. Other embodiments besides the ones described above may be articulated as well. The terms and expressions, therefore, serve only to describe the invention by example only and not to limit the invention. It is expected that others will perceive differences which, while differing from the foregoing, do not depart from the spirit and scope of the invention herein described and claimed.

It is therefore intended that the foregoing detailed description be regarded as illustrative rather than limiting, and that it be understood that it is the following claims, including all equivalents, that are intended to define the spirit and scope of this invention.

We claim:

1. A drive mechanism capable of being secured to a flush lever of a sanitary fixture, wherein said flush lever is secured to a flushing mechanism of said sanitary fixture by a connecting element, said drive mechanism comprising:

an actuator operably engaging said flush lever;

an electric motor operably connected to said actuator, wherein said actuator and said electric motor are such that upon movement of said flush lever to a full stop position by the activation of said electric motor, further activation of said electric motor causes rotation of said moveable plate to prevent stalling of said electric motor;

an enclosure for said actuator and said electric motor, said enclosure comprising an attachment system comprising:

first and second bracket halves; and first and second removable insert halves positioned in said first and second bracket halves.

2. The drive mechanism of claim 1 wherein said attachment system rotatably encases said connecting element.

3. The drive mechanism of claim 1 wherein said first and second removable insert halves comprise a complementary topography to said connecting element.

4. The drive mechanism of claim 3 wherein said connecting element further comprises a bushing and a nut.

5. The drive mechanism of claim 1 wherein said first and second removable insert halves are biased against said connecting element.

6. The drive mechanism of claim 1 wherein said first and second removable insert halves further comprise detents along opposing faces.

7. The drive mechanism of claim 1 wherein:

said first and second bracket halves further comprises at least one aperture; and said first and second removable insert halves further comprise at least one pin wherein said at least one pin engages said at least one aperture to secure said first and second removable inserts into said first and second bracket halves.

* * * * *

UNITED STATES PATENT AND TRADEMARK OFFICE
CERTIFICATE OF CORRECTION

| | |
|---|---|
| PATENT NO. | : 7,367,541 B2 |
| APPLICATION NO. | : 10/382111 |
| DATED | : May 6, 2008 |
| INVENTOR(S) | : Kenneth J. Muderlak et al. |

It is certified that error appears in the above-identified patent and that said Letters Patent is hereby corrected as shown below:

Column 17, line 18, claim 1 please insert before the word "such", --mounted on a moveable plate--

Signed and Sealed this

Ninth Day of September, 2008

JON W. DUDAS
*Director of the United States Patent and Trademark Office*